US008881306B2

(12) United States Patent
Feldman et al.

(10) Patent No.: US 8,881,306 B2
(45) Date of Patent: Nov. 4, 2014

(54) ARCHITECTURE SYSTEM FOR IN-STORE READING

(71) Applicant: barnesandnoble.com llc, New York, NY (US)

(72) Inventors: Alexandr Feldman, San Ramon, CA (US); Kelson Khai Dinh Tran, San Jose, CA (US); Venkateswaran Ayalur, Cupertino, CA (US)

(73) Assignee: Barnes and Noble, Inc., New York, NY (US)

( * ) Notice: Subject to any disclaimer, the term of this patent is extended or adjusted under 35 U.S.C. 154(b) by 0 days.

(21) Appl. No.: 13/681,785

(22) Filed: Nov. 20, 2012

(65) Prior Publication Data

US 2014/0143892 A1    May 22, 2014

(51) Int. Cl.
H04L 29/06 (2006.01)
G06F 21/44 (2013.01)
(52) U.S. Cl.
CPC ..................................... G06F 21/44 (2013.01)
USPC .......................................................... 726/29
(58) Field of Classification Search
USPC .......................................................... 726/29
See application file for complete search history.

(56) References Cited

U.S. PATENT DOCUMENTS

| 7,536,725 | B2 | 5/2009 | Raciborski |
| 7,653,574 | B2 | 1/2010 | Harper et al. |
| 7,684,336 | B2 | 3/2010 | Cnudde et al. |
| 8,488,661 | B2 | 7/2013 | Menon et al. |
| 2003/0144793 | A1* | 7/2003 | Melaku et al. ................. 701/209 |
| 2003/0163399 | A1* | 8/2003 | Harper et al. .................... 705/35 |
| 2004/0039750 | A1 | 2/2004 | Anderson et al. |
| 2004/0083233 | A1 | 4/2004 | Willoughby |
| 2004/0249768 | A1 | 12/2004 | Kontio et al. |
| 2005/0021781 | A1* | 1/2005 | Sunder et al. ................. 709/229 |
| 2005/0124319 | A1* | 6/2005 | Williams et al. .............. 455/411 |
| 2005/0165726 | A1 | 7/2005 | Kawell. Jr. et al. |
| 2007/0233601 | A1* | 10/2007 | Nakada et al. .................. 705/51 |
| 2007/0256092 | A1 | 11/2007 | Chung et al. |
| 2008/0062940 | A1 | 3/2008 | Othmer et al. |
| 2008/0097858 | A1 | 4/2008 | Vucina et al. |
| 2008/0107031 | A1 | 5/2008 | Cnudde et al. |
| 2009/0055408 | A1 | 2/2009 | Warren et al. |
| 2009/0100068 | A1 | 4/2009 | Gauba et al. |
| 2009/0106393 | A1 | 4/2009 | Parr et al. |
| 2009/0165083 | A1 | 6/2009 | McLean et al. |
| 2009/0172798 | A1* | 7/2009 | Upp ............................... 726/10 |
| 2009/0310663 | A1 | 12/2009 | Menon et al. |
| 2011/0153833 | A1 | 6/2011 | Kothari et al. |
| 2011/0206023 | A1* | 8/2011 | Cohn et al. ..................... 370/338 |
| 2013/0031643 | A1* | 1/2013 | Rogel et al. .................... 726/29 |
| 2013/0134213 | A1 | 5/2013 | Pallakoff et al. |
| 2014/0143892 | A1* | 5/2014 | Feldman et al. ................ 726/29 |

OTHER PUBLICATIONS

"Intelligent Store—An Innovative Technological Solution for Retail Activities with Mobile Access", Stan, C.E. ; Inst. for Comput., Bucharest ; Dumitrescu, D. ; Caras, V. ; Tiliute, D.E. Computing in the Global Information Technology, 2008. ICCGI '08. The Third International Multi-Conference on Date of Conference: Jul. 27, 2008-Aug. 1, 2008.*

(Continued)

*Primary Examiner* — Harris Wang
(74) *Attorney, Agent, or Firm* — Finch & Maloney PLLC

(57) ABSTRACT

An architecture and techniques to facilitate lending of digital content at an authorized location to an authenticated electronic device.

10 Claims, 10 Drawing Sheets

(56) References Cited

OTHER PUBLICATIONS

Kurkovsky, Stan, and Karthik Harihar. "Using ubiquitous computing in interactive mobile marketing." Personal and Ubiquitous Computing 10.4 (2006): 227-240.*

"Between Smart Clients and Access Gateway", iPass Generic Interface Specification, 2004 iPass Inc., Version 1.3, dated Sep. 4, 2004, 27 pages.

"Open Portal—A flexible portal framework for Java," Open Portal, http://openportal.sourceforge.net/, 2 pages, printed from the Internet on Mar. 13, 2013.

"Best Current Practices for Wireless Internet Service Provider (WISP) Roaming," Wi-Fi Alliance—Wireless ISP Roaming (WISPr), Version 1.0, 37 pages, release date Feb. 2003.

Pallakoff, U.S. Appl. No. 13/910,865, filed Jun. 5, 2013, entitled, "System and Method for Transference of Rights to Digital Media via Physical Tokens."

Feldman, et al., U.S. Appl. No. 13/681,813, filed Nov. 20 2012, entitled, "Method for a Transactional Flow to Enable In-Store Reading."

Feldman, et al., U.S. Appl. No. 13/681,815, filed Nov. 20, 2012, entitled, "Method for Authentication for In-Store Reading."

Ayalur, et al., U.S. Appl. No. 13/681,821, filed Nov. 20, 2012, entitled, "Method for Registering a Device."

Final Office Action dated Jan. 13, 2014 in U.S. Appl. No. 13/681,813, 28 pages.

Applicant-Initiated Interview Summary dated Mar. 4, 2014 in U.S. Appl. No. 13/681,813, 4 pages.

Summary of Interview filed Mar. 11, 2014 in U.S. Appl. No. 13/681,813, 1 page.

Non-final Office Action dated Aug. 15, 2013 in U.S. Appl. No. 13/681,813, 18 pages.

Non-final Office Action dated Feb. 20, 2014 in U.S. Appl. No. 13/681,815, 22 pages.

Response to Non-final Office Action dated Nov. 7, 2012 (actually filed Nov. 7, 2013) in U.S. Appl. No. 13/681,813, 15 pages.

Notice of Allowance dated Jul. 11, 2014 in U.S. Appl. No. 13/681,821, 22 pages.

* cited by examiner

US 8,881,306 B2

ARCHITECTURE SYSTEM FOR IN-STORE READING

RELATED APPLICATIONS

This application is related to U.S. application Ser. No. 13/681,813, filed Nov. 20, 2012 and titled "Method for a Transactional Flow to enable In-Store Reading" and U.S. application Ser. No. 13/681,815, filed Nov. 20, 2012 and titled "Method for Authentication for In-Store Reading". Each of these applications is herein incorporated by reference in its entirety.

FIELD OF DISCLOSURE

This disclosure relates to digital content distribution and, in particular, to a consumer system for downloading and using digital content within the confines of an authorized store.

BACKGROUND

Copyright owners have legitimate business and legal concerns regarding digital content sharing and lending. In contrast to paper copies of books and publications, copies of digital content are relatively easy to make and distribute. A secure and flexible method and system are needed for lending digital content.

BRIEF DESCRIPTION OF THE DRAWINGS

Subject matter is particularly pointed out and distinctly claimed in the concluding portion of the specification. The claimed subject matter, however, both as to organization and method of operation, together with features and advantages thereof, may best be understood by reference to the following detailed description when read with the accompanying drawings in which:

SUMMARY

One embodiment of the present invention is an in-store reading system for delivering free digital content to a customer's WiFi-enabled electronic device solely in the immediate vicinity of an authorized store. A customer may access this free, in-store digital content over an authorized store's Wi-Fi network, but only when the customer is physically in the authorized store, in accordance with some embodiments. In some cases, the electronic device must be associated with the customer's account and recognized by the in-store reading system. Digital content may be delivered to the customer's electronic device and freely used for a limited time. In one specific embodiment, the free digital content is delivered to a customer for an entire publication. In contrast, in another embodiment, the free digital content is delivered a "page" or chunk at a time as the customer reads. In some embodiments, once the time limit for using the digital content expires or the customer leaves the authorized store, the in-store digital content is no longer accessible to the customer. Variations and other embodiments will be apparent in light of this disclosure.

DETAILED DESCRIPTION

Figure 1:
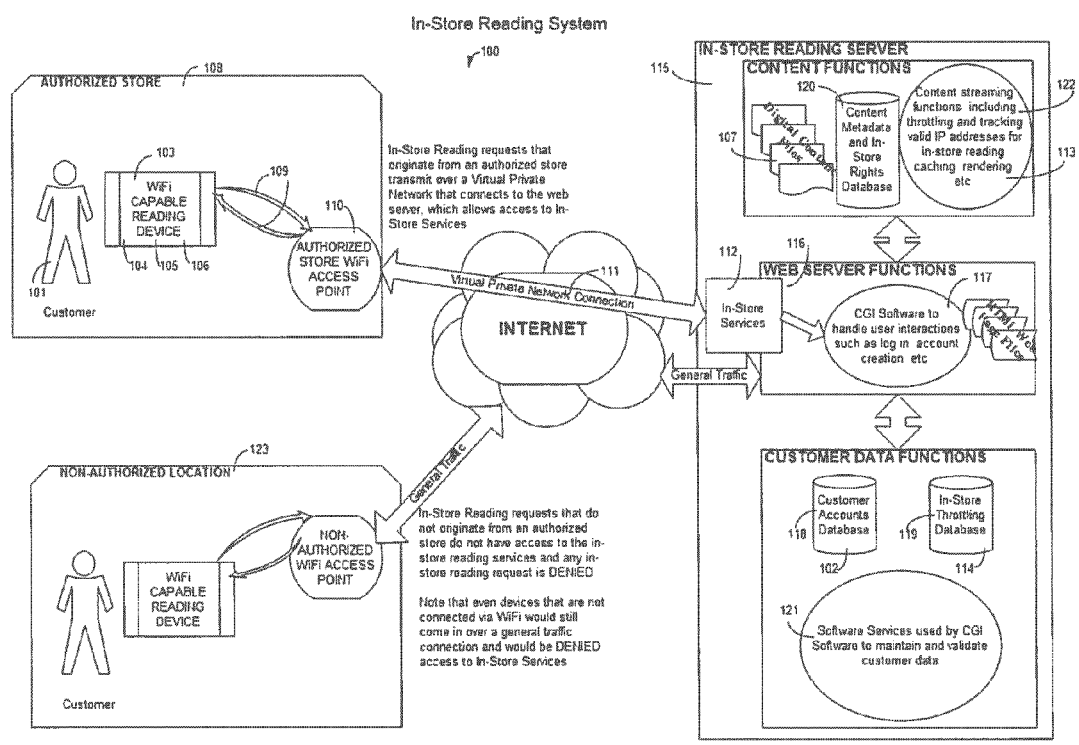
FIG. 1 shows a conceptual block diagram representation of an in-store reading system configured in accordance with an embodiment of the present invention.

FIG. 1 shows components of in-store reading system 100 configured in accordance with an embodiment of the present invention. Customer 101 is an authorized user of in-store reading system 100. Customer 101 has account 102, which authorizes customer 101 to use in-store reading system 100. Customer 101 can access in-store reading system 100 using device 103. Device 103 is a device that customer 101 previously associated with account 102 using account credentials of customer 101. Device 103 includes device user interface 104 and device content reading application 105. Device user interface 104 enables customer 101 to interact with device 103, including logging into account 102 and engaging with device content reading application 105. Customer 101 engages with device content reading application 105 to use digital content when participating in in-store reading system 100. Device content reading application 105 includes device in-store reading interface 106 that provides the means for customer 101 to discover, request, and receive digital content 107 when customer 101 is in authorized store 108. Device 103 can be, for example, an eBook reader, a cell phone, an MP3 player, a laptop computer, a Personal Digital Assistant, or other such electronic device.

Digital content 107 is digital content with in-store reading rights. Digital content 107 is free (no cost to customer 101) and only available in authorized store 108. Authorized store 108 is a physical location with an in-store WiFi network 109 and an authorized WiFi Access Point (WAP) 110. Customer 101 is only allowed to request and receive digital content 107 on device 103 while physically located in the vicinity of authorized store 108 and connected to WAP 110. When customer 101 turns on device 103 in authorized store 108, device 103 may detect in-store WiFi network 109 and access 109 through authorized WAP 110. Once device 103 is active on in-store WiFi network 109 and customer 101 interacts with device in-store reading interface 106, transmissions to and from device 103 occur over a Virtual Private Network (VPN) 111 connection. VPN 111 secures and separates in-store reading traffic between device 103 and other electronic components of in-store reading system 100 from general traffic originating inside and outside authorized store 108.

Device in-store reading interface 106 is used by customer 101 to select and request digital content 107. Device 103 transmits a request for digital content 107 over VPN 111 to in-store web services 112. In-store web services 112 handles the request for digital content 107 and the streaming of digital content 107 back to device 103. To stream back to device 103, digital content 107 is decomposed into digital content chunk 107*a*, digital content chunk 107*b*, digital content chunk 107*c*, and so on. Digital content chunk 107*a* is an initial data portion of digital content 107 that is streamed to device 103. Digital content chunk 107*b* is the next data portion of digital content 107 that is streamed after 107*a*. Digital content chunk 107*c* is the next data portion of digital content 107 that is streamed after 107*b* and so on. The streamed delivery of digital content chunks 107*a*, 107*b*, 107*c*, and so on to device 103 is throttled (controlled, metered, timed) based on in-store reading throttling algorithm 113. In-store reading throttling algorithm 113 gauges the time spent and speed by which customer 101 consumes each digital content chunk of digital content 107 and adjusts the streaming of 107 accordingly. A customer content throttling record 114 associated with customer 101 and digital content 107 is maintained in a database in-store reading system 100.

In-store reading server 115 manages the delivery of digital content 107 and additional in-store reading functions of in-store reading system 100. In-store reading server 115 handles front-end functions related to web server operations and user interactions with in-store reading interfaces. In-store reading server 115 also handles all backend functions of in-store reading system 100 related to managing accounts, tracking in-store content throttling, maintaining content metadata and in-store reading rights, and providing content streaming services.

In-store reading server 115 employs web server 116 and Common Gateway Interface (CGI) software 117 to handle interactions between front-end components; such as device in-store reading interface 106 and in-store web services 112, and back-end database components of in-store reading system 100. Web server 116 services include serving up in-store web services 112. CGI software 117 services include handling log in to account 102 and processing content throttling records.

Back-end database components of in-store reading system 100 include customer accounts database 118, in-store throttling database 119, and content metadata database 120. Records for account 102 are stored and managed in customer accounts database 118. Records for customer content throttling record 114 are stored and managed in in-store throttling database 119. Content metadata database 120 serves as a source of metadata and in-store reading rights information for individual digital content items in in-store reading system 100. In-store reading rights information in content metadata database 120 indicates that digital content 107 may be used for in-store reading.

As backend components of in-store reading server 115, CGI software 117 interfaces with customer data services 121 to access customer accounts database 118 and in-store throttling database 119. Customer data services 121 processes database lookups, such as verifying customer data in account 102 for customer 101 logins. Customer data services 121 also processes database updates, such as creating and updating customer content throttling record 114.

CGI software 117 interfaces with in-store content streaming services 122 to manage content streaming functions. Such functions include throttling and tracking valid accounts and IP addresses for in-store reading, and caching and rendering digital content chunks 107*a*, 107*b*, 107*c*, and so on.

In FIG. 1, non-authorized location 123 is presented for illustration purposes only to show general traffic that might occur in or near a physical authorized store 108. Non-authorized location 123 is not a component within-store reading system 100.

In the preferred embodiment of the invention, in-store reading system 100 is an in-store electronic book (eBook) reading system. The embodiment of the invention is not intended to limit in-store reading system 100 to an in-store eBook reading system. In-store reading system 100 may apply to the in-store consumption of other digital content, such as digital movies, digital music, digital audio books, digital pictures, or other downloadable digital content.

In the preferred embodiment of the invention, digital content 107 is an eBook. The embodiment of the invention is not intended to limit digital content 107 to an eBook. Digital content 107 may be other digital content, such as digital movies, digital music, digital audio books, digital pictures, or other downloadable digital content.

In the preferred embodiment of the invention, device 103 is a mobile, WiFi-capable electronic reader (eReader) device. The embodiment of the invention is not intended to limit device 103 to such an eReader device. Device 103 may be another type of mobile consumer electronic device, such as a multi-purpose cell phone.

Operation

Figure 2:
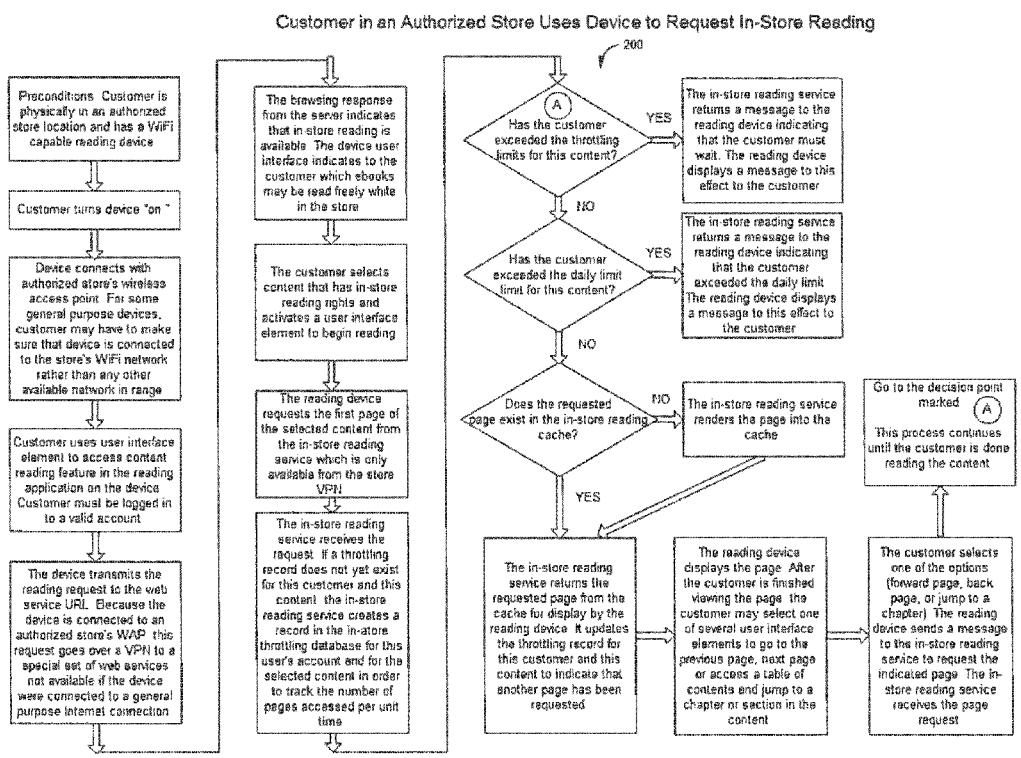
FIG. 2 shows a conceptual block diagram representation of a method for an in-store reading system where a customer uses a device to get free in-store digital content to read, in accordance with an embodiment of the present invention.

FIG. 2 shows an exemplary method 200 for requesting free in-store reading content, where a customer 101 accesses and reads digital content 107 using device 103, in accordance with an embodiment of the present invention. Customer 101 is physically located in authorized store 108 and turns on device 103. Device 103 detects that in-store WiFi network 109 is in range and connects to it through authorized WAP 110. Device 103 may be running device content reading application 105 already, or customer 101 may use device user interface 104 to invoke device content reading application 105. If customer 101 is not automatically logged into account 102, customer 101 uses device user interface 104 to log in. Customer 101 or device content reading application 105 invokes device in-store reading interface 106 to discover the availability of in-store reading system 100 and digital content 107 in authorized store 108. Device 103 transmits a request for digital content 107 over VPN 111 to the URL address of in-store web services 112. In-store web services 112 passes in the request for digital content 107 to in-store reading server 115. In-store reading server 115 responds back to in-store web services 112 that digital content 107 is available. The response that digital content 107 is available is sent by in-store web services 112 over VPN 111 to device 103. Device in-store reading interface 106 indicates to customer 101 that digital content 107 is available. Customer 101 uses device in-store reading interface 106 to select digital content 107. Customer 101 uses an appropriate control on device user interface 104 to begin reading digital content 107 using device content reading application 105.

To initiate free in-store reading of digital content 107, device 103 sends a request to get digital content 107. The request is sent over VPN 111 to the URL address of in-store web services 112. In-store web services 112 interfaces with CGI software 117 to access customer content throttling record 114 and to initiate in-store streaming throttling algorithm 113. If customer content throttling record 114 does not yet exist for customer 101 and digital content 107, customer data services 121 are invoked to create customer content throttling record 114 in the in-store throttling database 119. In-store web services 112 interfaces with CGI software 117 to invoke in-store content streaming services 122. In-store content streaming services 122 creates and caches, if necessary, and then streams digital content chunks 107*a*, 107*b*, 107*c*, and so on to device 103 based on how customer 101 consumes digital content 107. The streaming of digital content chunks 107*a*, 107*b*, 107*c*, and so on to device 103 is throttled faster or slower as determined by in-store streaming throttling algorithm 113. If customer 101 requests a digital content chunk and throttling algorithm 113 determines that the request came in too quickly based on the current throttling limits, then in-store web services 112 returns a message to device 103 indicating that customer 101 must wait before gaining access to the requested content chunk. Another factor evaluated by in-store content streaming services 122 is the time limit that customer 101 is allowed to consume digital content 107 in an already established time period. For example, customer 101 may be limited to consuming digital content 107 to two cumulative hours within a business day. If a request for a digital content chunk exceeds the time limit that customer 101 is allowed to consume digital content 107, then in-store web services 112 returns a message to device 103 indicating that customer 101 must wait before gaining access to digital content 107 again. Device 103 presents a user message to that effect to customer 101 through device in-store reading interface 106. In addition, if customer 101 exceeds an already established maximum time period for consuming an individual digital content chunk, then the timer for the time limit of digital content 107 stops. This allows customer 101 to pause from active usage of digital content 107 without negatively affecting 101's time limit for using digital content 107. For example, this allows customer 101 to pause from consuming 107, engage in a conversation, and then resume consuming 107. Because the timer stops during customer 101's pause in consuming 107, the time expended beyond the established maximum time period during the pause is not counted towards the time limit of digital content 107.

If customer 101 has not exceeded the time limit for consuming digital content 107, then in-store web services 112 checks for the availability of digital content chunk 107a rendered in an in-store reading cache on in-store reading server 115. If a rendered digital content chunk 107a does not exist in the cache, then in-store content streaming services 122 renders it into the cache. If rendered digital content chunk 107a does exist in the cache, then in-store web services 112 returns the requested digital content chunk 107a to device 103 for display. CGI software 117 invokes customer data services 121 to update customer content throttling record 114 in in-store throttling database 119.

After customer 101 finishes consuming digital content chunk 107a, customer 101 selects a control on device user interface 104 to invoke the next desired action in device content reading application 105. For example, customer 101 may select a navigation control to go to a previous page, next page, access a table of contents, or jump to a chapter or section of digital content 107. Once customer 101 makes the desired selection, device 103 transmits this next request over VPN 111 to in-store web services 112. Processing proceeds as before and, upon success, in-store web services 112 returns the requested digital content chunk 107b to device 103 for display. Processing continues as before for digital content chunk 107c and so on until customer 101 finishes or exceeds the time limit for digital content 107. If customer 101 exceeds the time limit for digital content 107, a message is returned to device 103 and a user message is displayed in device in-store reading interface 106, indicating that customer 101 must wait before gaining access to digital content 107 again.

Figure 3:
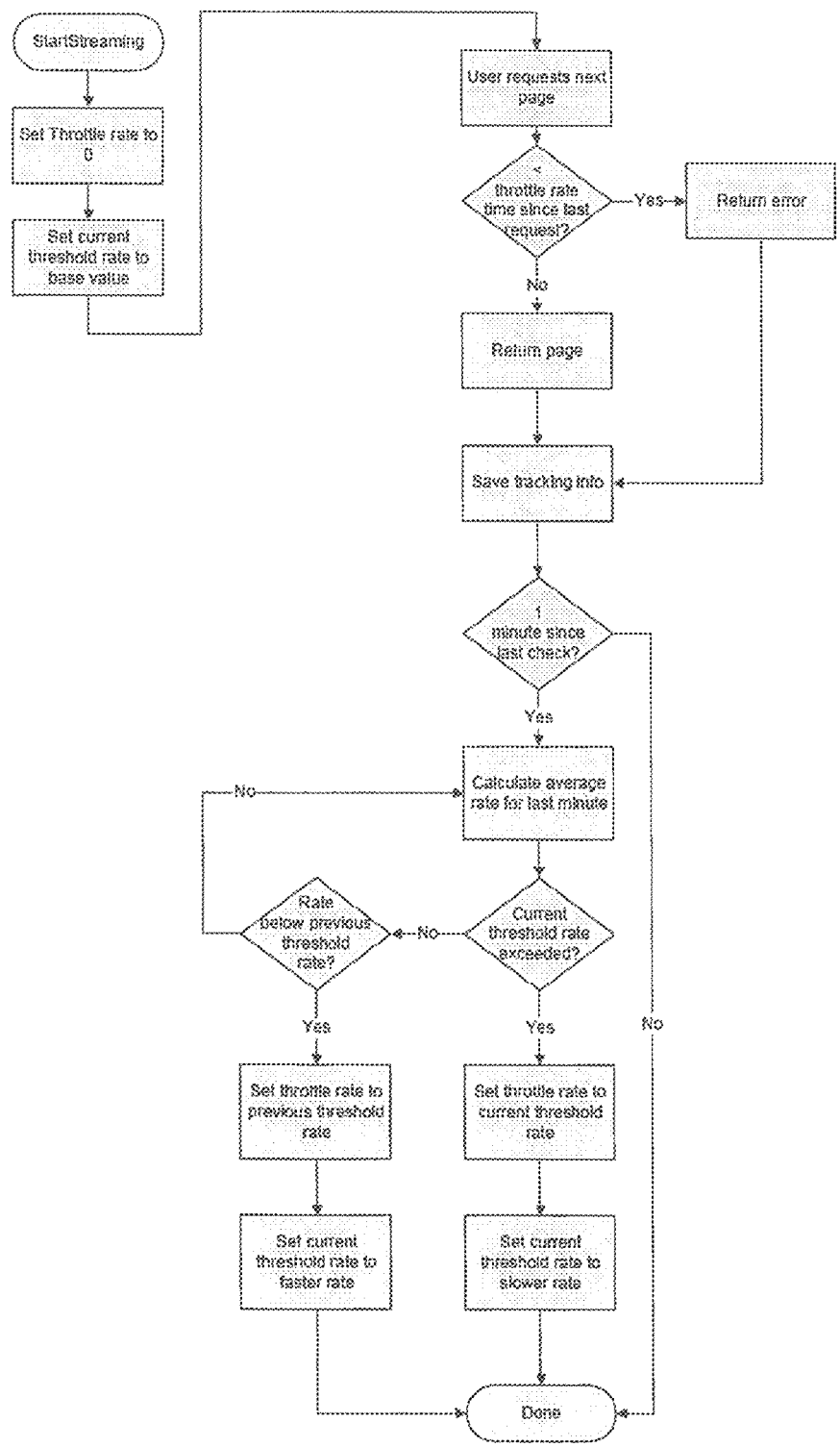
FIG. 3 shows a conceptual block diagram representation of a method for throttling the digital content that is being streamed to a customer in an in-store reading system, in accordance with an embodiment of the present invention.

FIG. 3 shows a representation of an exemplary method 300 of performing in-store streaming throttling algorithm 113, in accordance with an embodiment of the present invention. When streaming starts for digital content 107, the throttle rate is set to zero and the current threshold rate is set to a base value. Throttle rate may be, for example, one digital content chunk per 10 seconds. Current threshold rate may be, for example, two digital content chunks per 10 seconds. Any recalculation of the rates may be set to occur in less than one minute timeframes. When device 103 requests the next digital content chunk, say digital content chunk 107b, 107b is delivered and customer content throttling record 114 is updated in in-store throttling database 119. Upon device 103 requesting digital content chunk 107c, in-store streaming throttling algorithm 113 calculates the average rate of chunk requests for the last minute. If the calculated rate exceeds the current threshold rate, then the throttle rate is set to the current threshold rate and the current threshold rate is set to a slower rate. If the calculated rate does not exceed the current threshold rate and is below the previous threshold rate, then the throttle rate is set to the previous threshold rate and the current threshold rate is set to a faster rate. Throttling calculations stop when customer 101 becomes inactive for the maximum time set for a customer to reasonably consume a digital content chunk.

Figure 4:
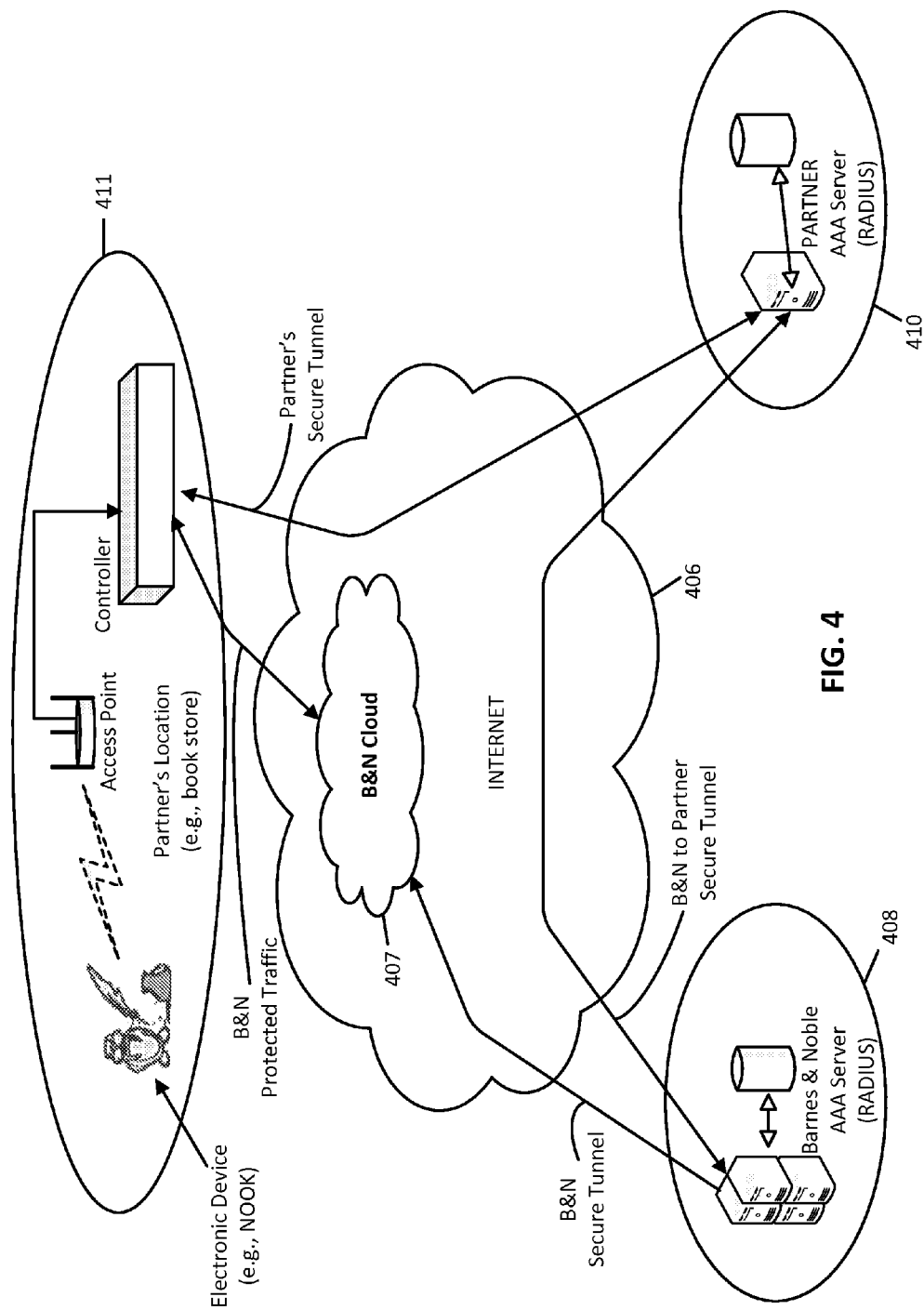
FIG. 4 shows a block diagram representation of architecture to support in-store lending for an entire publication that is to be streamed to a customer for an in-store reading system, in accordance with an embodiment of the present invention.

FIG. 4 shows a block diagram representation of an architecture to support in-store lending for an entire publication that is to be streamed to a customer for an in-store reading system configured in accordance with an embodiment of the present invention.

In this block diagram, four different blocks form an architecture configured to facilitate lending of digital content to a consumer for an entire publication.

In one embodiment, block 411 represents a commercial location, such as, a bookstore. Within the block 411, a user with an electronic device, such as an ebook reader, tablet, or smartphone communicates with a controller via an access point. The controller communicates with other blocks 408 and 410 via block 406 and secure tunnel paths.

In one embodiment, the block 406 represents the Internet. Within the Internet, the techniques provided herein allow for forming or using a private or public cloud, as depicted by the cloud 407 defined as B&N (for Barnes and Noble), in accordance with some embodiments. The blocks 408 and 410 represent authorization server systems by the entities controlling the lending, such as a retail store and a content provider. In this embodiment, the authorization server systems 408 and 410 utilize a server program that handles user requests for access to computer resources and provide authentication, authorization, and accounting (AAA) services. In this embodiment, the AAA servers communicate with applications and devices in the Remote Authentication Dial-in User Service (RADIUS).

In one embodiment, a partner or vendor system 410 identifies the access point by assigning a name to the access point or using a predetermined SSID (Service Set Identifier) that the electronic device has been pre-built with. Also, a security setting may be utilized between the electronic device and access point to allow for different types of security settings, such as, Open (non-secure and adheres to most public hot spot settings) or Secure (authenticating electronic device based on client certificates loaded in factory).

Figure 5:
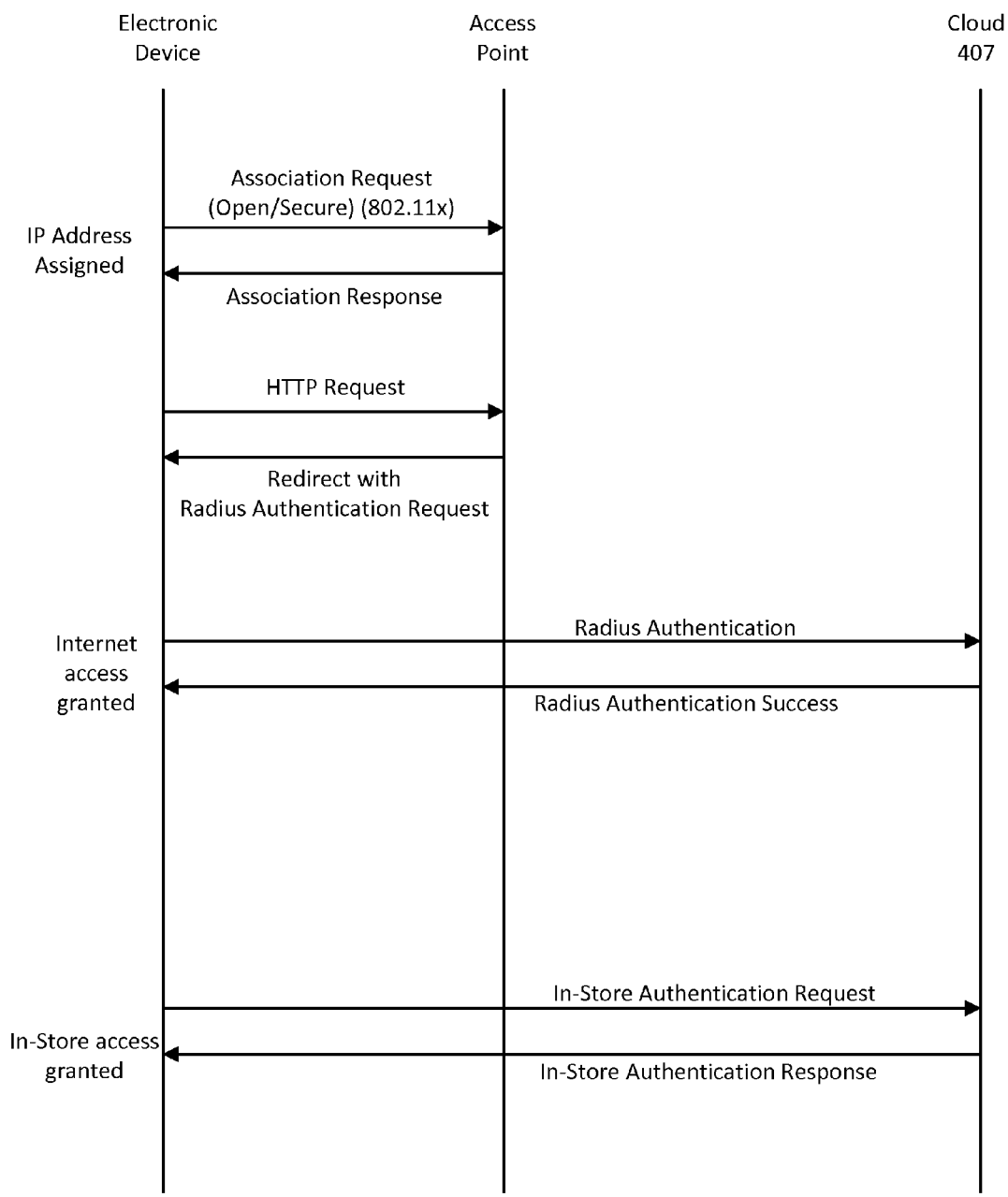
FIG. 5 shows a flow to support in-store lending for an entire publication that is to be streamed to a customer for an in-store reading system, in accordance with an embodiment of the present invention.

FIG. 5 shows a flow to support in-store lending for an entire publication that is to be streamed to a customer for an in-store reading system, in accordance with an embodiment of the present invention. As previously discussed, FIG. 4 depicts an example architecture to enable in-store lending. FIG. 5 details the flow of the signals between the different blocks for the authorized location 411 that contains the electronic device and access point, and the Internet and cloud 407.

Initially, the electronic device issues an association request, an HTTP request, and an in-store authentication request to the access point. Consequently, the access point replies with an association response back to the electronic device that results in an IP address being assigned and a redirect with Radius authentication request that is sent to the cloud 407. Consequently, the cloud 407 responds with a Radius Authentication success message that allows for granting Internet access and an in-store authentication response.

Figure 6:
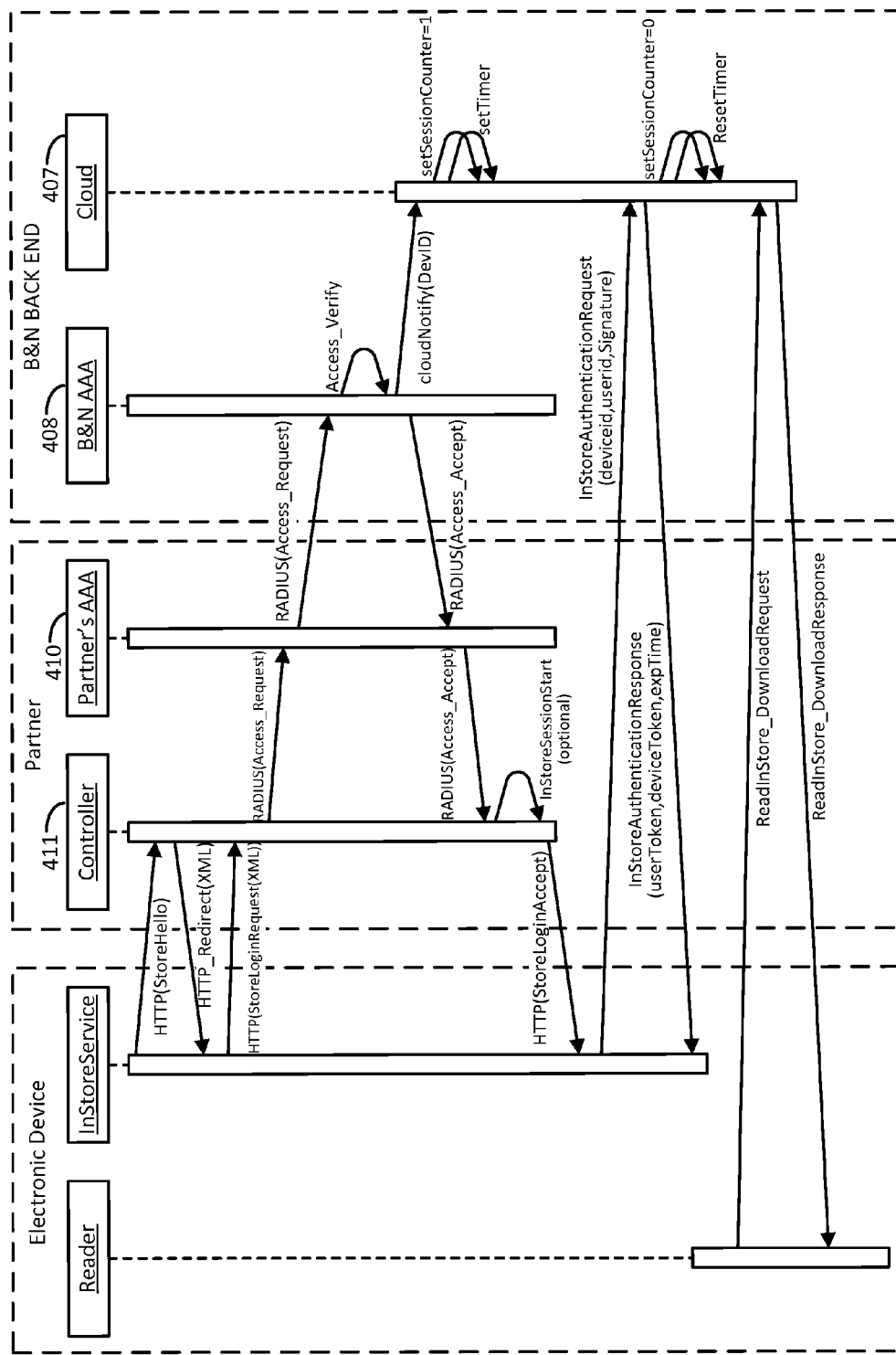
FIG. 6 shows a more detailed flow of FIG. 5 to support in-store lending for an entire publication that is to be streamed to a customer for an in-store reading system, in accordance with an embodiment of the present invention.

FIG. 6 shows a more detailed flow of FIG. 5 to support in-store lending for an entire publication that is to be streamed to a customer for an in-store reading system. In this detailed flow, the partner block represents the signaling for server block 410 depicted in FIG. 4 and the B&N back end block represents the signaling for server block 408 and B&N cloud 407 depicted in FIG. 4.

FIGS. 7-10 show a method for authentication for the electronic device in accordance with an embodiment of the present invention.

Figure 7:
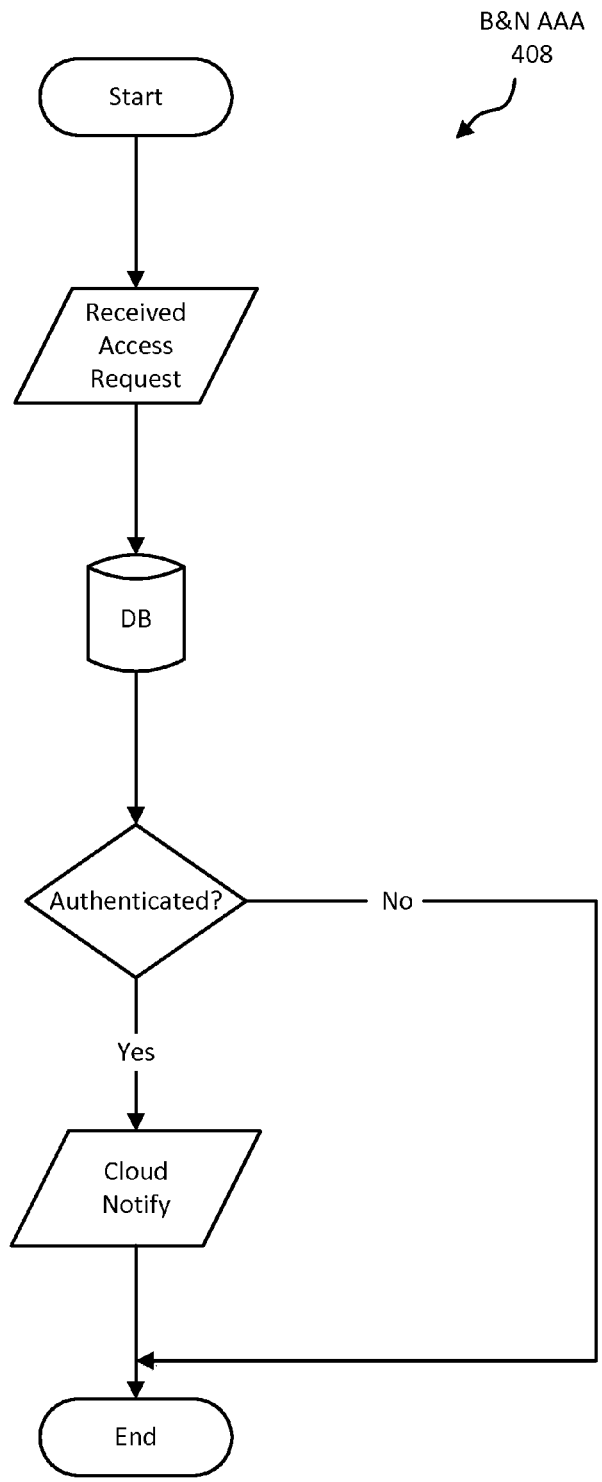
FIGS. 7-10 show a method for authentication for the electronic device in accordance with an embodiment of the present invention.

FIG. 7 depicts an overview of receiving an access request from the electronic device. Initially, the electronic device requests access and a database lookup are performed based on approved electronic devices. If authenticated, a notification is sent to a cloud 407 as previously discussed in connection with FIGS. 4 and 6.

Figure 8:
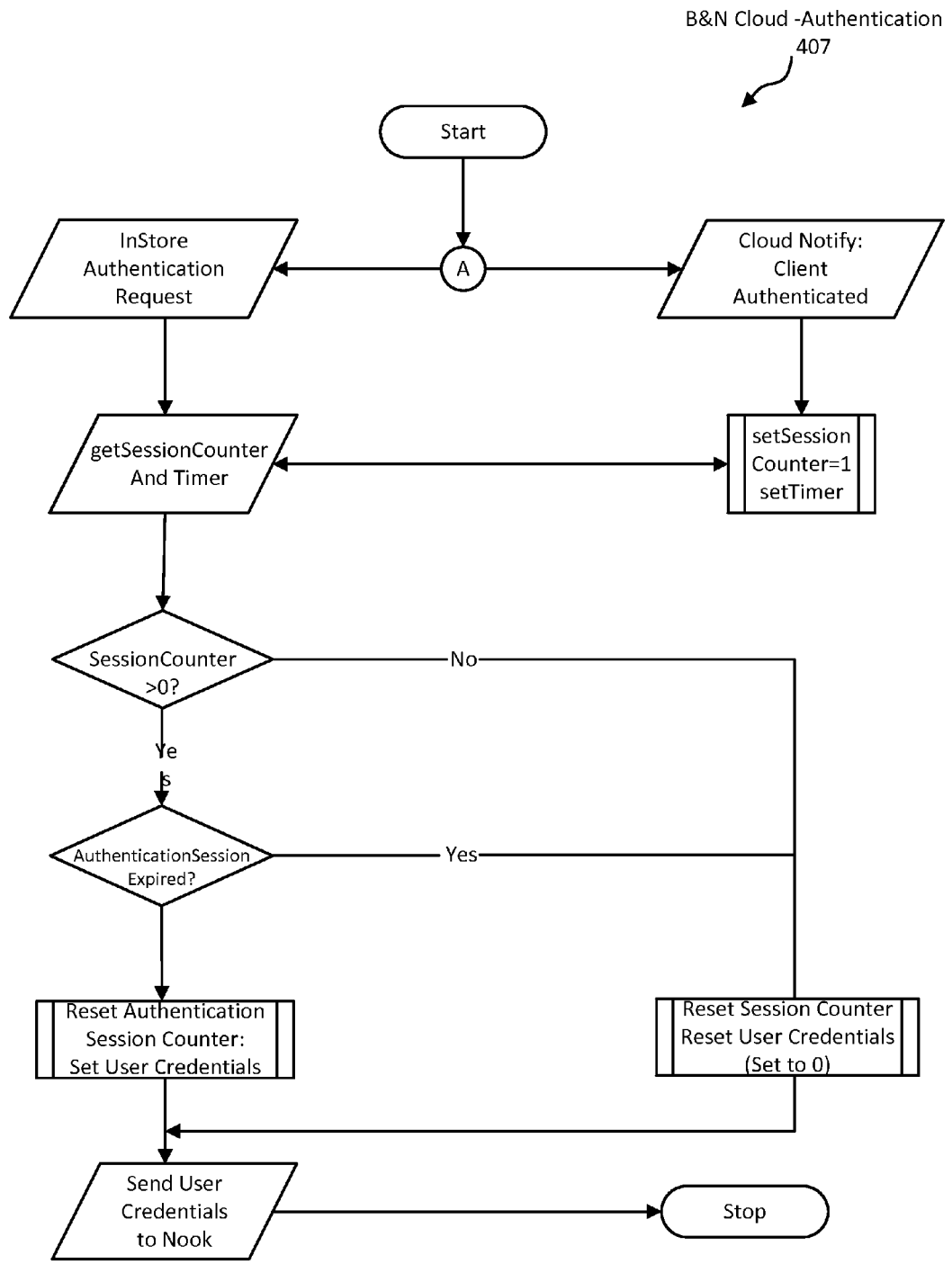
Figure 9:
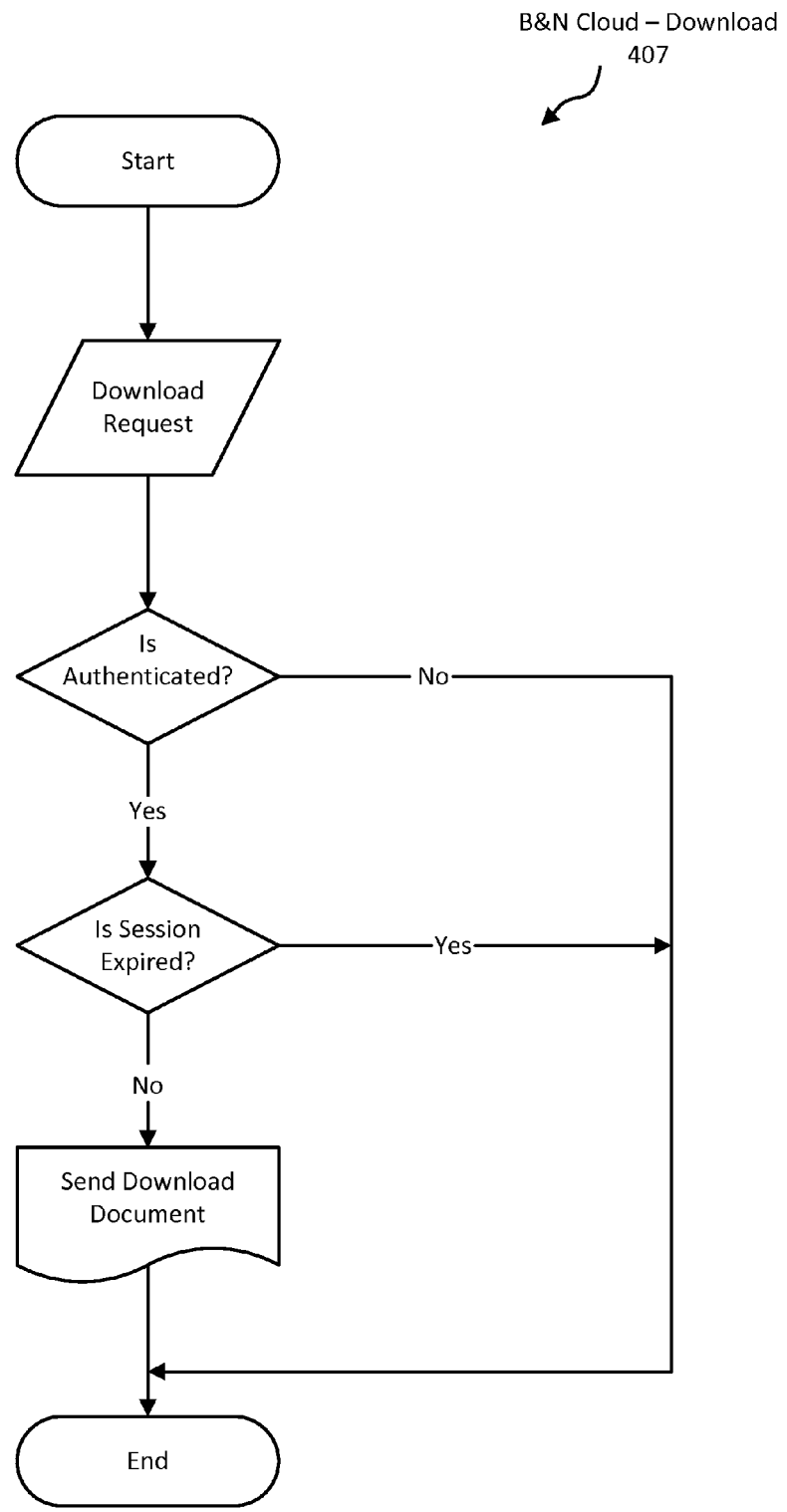
Figure 10:
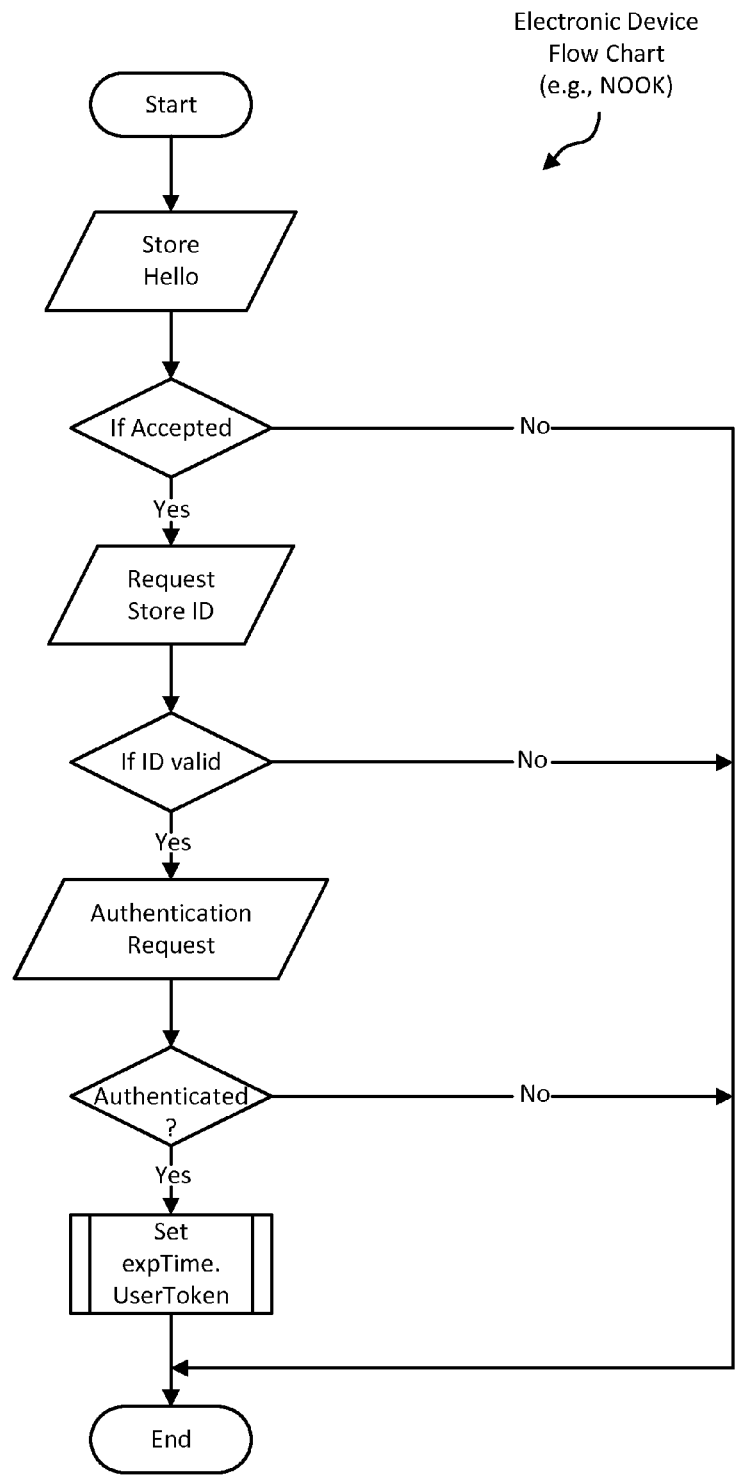

FIG. 8 depicts the in-store authentication flow based on a predetermined session counter associated with each electronic device, in accordance with an embodiment. FIG. 9 depicts the cloud 407 allowing a download of the document based on authenticating the electronic device and whether the session still being active (time hasn't expired on the particular user's session), in accordance with an embodiment. FIG. 10 depicts the initial requests from the electronic device to be accepted based on a store identification and authentication request, in accordance with an embodiment.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A multi-server method for lending digital content, comprising:
   receive, at a first authentication, authorization, and accounting (AAA) server system and via a wireless access point at a retail store location, an association request from a mobile electronic device, wherein the association request includes a request for a store ID associated with the retail store location;
   respond, via the first AAA server system and access point, with an association response back to the electronic device, wherein the association response includes the store ID;
   receive, at a second AAA server system and via the access point at the retail store location, a store login request from the electronic device, wherein the store login request includes a device ID for the electronic device along with a request for in-store access to digital content, and wherein the second AAA server system is configured to send a notification to a third server system if the store login request for in-store access to digital content is authorized;
   generate, via the third server system and in response to receiving the notification, a session for the electronic device and a redirect, wherein generating the session includes sending the redirect to the electronic device;
   receive, at the third server system and via the access point at the retail store location, an in-store authentication request from the electronic device based on the redirect, wherein the in-store authentication request includes the device ID;
   respond, via the third server system and access point, with an authentication response back to the electronic device, wherein the authentication response grants the electronic device in-store access to digital content accessible via the third server system, and wherein the in-store access to the digital content is granted only while the electronic device maintains proximity to the retail store location;
   receive, at the third server system, an in-store download request from the electronic device by virtue of the granted access, wherein the download request includes a request for digital content; and
   respond, via the third server system, with an in-store download response back to the electronic device, wherein the in-store download response includes at least a portion of the digital content.

2. The method of claim 1 wherein the device ID is a serial number associated with the electronic device.

3. The method of claim 1 wherein the second AAA server system and the third server system are associated with a content provider business entity and the first AAA server system is associated with another business entity that is a partner or vendor of the content provider business entity.

4. The method of claim 1 wherein the first AAA server system and access point are configured to authenticate an electronic device based on a factory-loaded client certificate.

5. The method of claim 1 wherein the first AAA server system is configured to communicate with the second AAA server via a Remote Authentication Dial-in User Service (RADIUS) protocol.

6. A multi-server system for lending digital content, comprising:
   a first authentication, authorization, and accounting (AAA) server system configured to receive, via a wireless access point at a retail store location, an association request from a mobile electronic device, wherein the association request includes a request for a store ID associated with the retail store location, the first AAA server system further configured to respond via the access point with an association response back to the electronic device, wherein the association response includes the store ID;
   a second AAA server system configured to receive, via the access point at the retail store location, a store login request from the electronic device, wherein the store login request includes a device ID for the electronic device along with a request for in-store access to digital content, and wherein the second AAA server system is further configured to send a notification to a third server system if the store login request for in-store access to digital content is authorized; and
   the third server system which is configured to, in response to receiving the notification, generate a session for the electronic device and a redirect, and send the redirect to the electronic device, wherein the third server system is further configured to:
   receive, via the access point at the retail store location, an in-store authentication request from the electronic device based on the redirect, wherein the in-store authentication request includes the device ID;
   respond, via the access point, with an authentication response back to the electronic device, wherein the authentication response grants the electronic device in-store access to digital content accessible via the third server system, and wherein the in-store access to the digital content is granted only while the electronic device maintains proximity to the retail store location;

receive an in-store download request from the electronic device by virtue of the granted access, wherein the download request includes a request for digital content; and respond with an in-store download response back to the electronic device, wherein the in-store download response includes at least a portion of the digital content.

7. The system of claim 6 wherein the device ID is a serial number associated with the electronic device.

8. The system of claim 6 wherein the second AAA server system and the third server system are associated with a content provider business entity and the first AAA server system is associated with another business entity that is a partner or vendor of the content provider business entity.

9. The system of claim 6 wherein the first AAA server system and access point are configured to authenticate an electronic device based on a factory-loaded client certificate.

10. The system of claim 6 wherein the first AAA server system is configured to communicate with the second AAA server via a Remote Authentication Dial-in User Service (RADIUS) protocol.

* * * * *